(12) United States Patent
Ito et al.

(10) Patent No.: US 6,633,624 B1
(45) Date of Patent: *Oct. 14, 2003

(54) CONDENSATE DEMINERALIZATION

(75) Inventors: Tomoaki Ito, Tokyo (JP); Makoto Fukami, Tokyo (JP); Jumpei Fukawa, Tokyo (JP)

(73) Assignee: Organo Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 34 days.

(21) Appl. No.: 09/718,056

(22) Filed: Nov. 21, 2000

(30) Foreign Application Priority Data

| Nov. 22, 1999 | (JP) | .................................... 11-330972 |
| Nov. 1, 2000 | (JP) | .................................... 2000-334538 |

(51) Int. Cl.$^7$ ............................................. G21C 19/30
(52) U.S. Cl. ........................ 376/313; 376/310; 521/25; 210/663
(58) Field of Search ................................. 376/310, 313; 521/25; 210/663

(56) References Cited

U.S. PATENT DOCUMENTS

| | | | | |
|---|---|---|---|---|
| 3,900,366 A | * | 8/1975 | Sakaguchi | .................... 376/250 |
| 4,087,357 A | * | 5/1978 | Barrett et al. | ................ 210/673 |
| 4,428,756 A | * | 1/1984 | Iniotakis | ....................... 55/484 |
| 4,657,731 A | * | 4/1987 | Otto et al. | |
| 4,770,790 A | * | 9/1988 | Oberhofer | ..................... 134/25.1 |
| 4,853,130 A | * | 8/1989 | D'Angelo et al. | |
| 4,882,018 A | * | 11/1989 | Tison | |
| 4,975,201 A | * | 12/1990 | Ma | |
| 5,132,019 A | * | 7/1992 | Fejes | |
| 5,154,878 A | * | 10/1992 | Busigin et al. | ............... 376/310 |
| 5,192,446 A | * | 3/1993 | Salem et al. | |
| 5,231,115 A | * | 7/1993 | Harris | |
| 5,387,348 A | | 2/1995 | Hagiwara et al. | ............ 210/662 |
| 5,397,477 A | * | 3/1995 | Salem et al. | |
| 5,403,492 A | * | 4/1995 | Salem et al. | ................. 210/683 |
| 5,714,643 A | * | 2/1998 | Sato et al. | |
| 5,830,361 A | | 11/1998 | DeMartino | .................... 210/679 |
| RE36,361 E | * | 11/1999 | Kearney et al. | ................ 127/42 |
| 6,284,124 B1 | * | 9/2001 | DiMascio et al. | |

FOREIGN PATENT DOCUMENTS

| | | | |
|---|---|---|---|
| JP | 53-67957 | * | 6/1978 |
| JP | 4-244207 | * | 9/1992 |
| JP | 9-184899 | | 7/1997 |
| JP | 9 184899 A | * | 7/1997 |
| JP | 2818943 B2 | * | 10/1998 |

OTHER PUBLICATIONS

Izumi et al, 1998, Performance of high cross–linkage gel type cation exhange resins for condensate polishers, IWC.*
Japan Patent Abstract, Publication No. JP53067957, Publication date Jun. 16, 1978, 1 page.
Japan Patent Abstract, Publication No. JP9184899, Publication date Jul. 15, 1997, 1 page.
Patent Abstracts of Japan, English translation of abstract, "Method for Reducing Eluation of Impurity From Condensate Desalting Apparatus of BWR Nuclear Power Plant", Publication No. 09184899A, Date of Publication Jul. 15, 1997, one page.
Paper presented at Engineers' Society of Western Pennsylvania 58th Annucal Meeting, International Water Conference held at the Westin William Penn Hotel, Pittsburgh, Pennsylvania, Nov. 3–5, 1997 entitled "Evaluation of Condensate Water Quality at a Thermal Power Plant by Using On–line Process ion Chromatographic Analyzer" by Toshio Sakurada of Kyushu Electric Power Co., Inc. and Junichi Igarashi of Organo Corporation, 15 pages.

* cited by examiner

*Primary Examiner*—Michael J. Carone
*Assistant Examiner*—John Richardson
(74) *Attorney, Agent, or Firm*—Rosenthal & Osha L.L.P.

(57) ABSTRACT

In a demineralization apparatus, a mixed bed of a gel type cation exchange resin having a moisture holding capacity of 41% or less or a degree of crosslinkage of 12% or greater is employed along with a porous type anion exchange resin. As a result, oxidation degradation of the cation exchange resin due to hydrogen peroxide can be inhibited and the performance of the ion exchange resins and of the condensate water demineralizer can be stabilized and maintained for a long period of time.

2 Claims, 2 Drawing Sheets

CONDENSATE DEMINERALIZATION

BACKGROUND OF THE INVENTION

1. Field of the Invention

The present invention relates to a condensate demineralization, and especially to an apparatus and a method for use in purification (demineralization) of condensate in power plants.

2. Description of the Related Art

In a facility such as, for example, a pressurized water reactor nuclear power plant, because there is a need to constantly maintain the quality of water within a steam generator pure, condensate water flowing into the steam generator from a condenser is purified by a condensate demineralizer(s). A boiling water reactor nuclear power plant is also equipped with a condensate demineralizer(s) for purifying condensate because there is a need for constantly maintaining the quality of water pure.

The condensate demineralizer is provided in order to demineralize condensate water by removing, using ion exchange resins, metal impurities leached from materials of construction such as pipes and salt impurities resulting from leakage of sea water used as the cooling water of the condenser.

The condensate demineralizer usually consists of a plurality of demineralization columns filled with a mixture of anion exchange resin and cation exchange resin for processing the condensate water and an external regeneration system which is designed to regenerate (rejuvenate) the ion exchange resins which have been exhausted, that is, when a breakthrough point has been reached. The exhausted ion exchange resins are transferred from the demineralization column to the regeneration system outside the demineralization section. The ion exchange resins thus regenerated are returned to the demineralization section for reuse.

The ion exchange resins can generally be categorized into either gel type or porous type, such as macroporous (MP) and macroreticular (MR), according to the structural characteristics. In those applications in which ion exchange resins are regenerated more frequently, porous type ion exchange resins with a greater physical strength (resistant to osmotic shocks) are generally used in order to allow for the swelling and contraction of the ion exchange resins.

When, on the other hand, the regeneration is not frequently required, such as in a case for a condensate water demineralizer for a boiling water reactor nuclear power plant, gel type ion exchange resins with a greater ion exchange capacity are typically used.

In either case, the anion exchange resin to be mixed and used with the cation exchange resin is usually of the same type as the cation exchange resin in terms of the porosity.

In any way, the performance of the ion exchange resin decreases as it is used over the years, and thus, there is a need for replacing the ion exchange resins once every few years. Performance decrease over years of use may be due to slough of organic materials such as polystyrene sulphonate (hereinafter abbreviated to "PSS") from the cation exchange resin under an oxidizing atmosphere. In particular, hydrazine is commonly added to condensate water of a pressurized water reactor nuclear power plant to prevent rust in the pipes. The hydrazine oxidizes and decomposes upon contact with air used for scrubbing or the like performed during the regeneration of the ion exchange resin, leading to generation of hydrogen peroxide. As a result, the cation exchange resin decomposes and PSS or the like is given off.

In a boiling water reactor nuclear power plant, no chemical is added to condensate water for preventing rust, and demineralized water as such is used. Thus, normally, ion exchange resins are not oxidized by an oxidizing agent in the condensate water demineralizer. However, during periodic checkups of the power plant, water within the nuclear reactor is radiation decomposed, thereby generating hydrogen peroxide. The water within the nuclear reactor is then passed through the condensate water demineralizer after the operation is restarted. Because of this water containing hydrogen peroxide is supplied to the condensate water demineralizer at a boiling water reactor nuclear power plant, promoting decomposition of the cation exchange resin just as in the case with a pressurized water nuclear power plant.

Moreover, leachables generated by the decomposition of the cation exchange resin, including the PSS described above, attach themselves to the anion exchange resin and contribute to a reduction of reactivity of the anion exchange resin. When the reactivity of the anion exchange resin is reduced, its performance of the removal of anion impurities (such as $Cl^-$ or $SO_4^{-2}$) contained in condensate water is reduced, water quality in the nuclear reactor (boiling water reactor nuclear power plant) or in the steam generator (pressurized water nuclear power plant) is reduced, and corrosion of construction materials is promoted.

Furthermore, as a result of the reduction in the reactivity of the anion exchange resin, leachables from the cation exchange resin flow into the condensate water without being captured by the anion exchange resin, thereby resulting in a deterioration of the treated water quality.

SUMMARY OF THE INVENTION

One object of the present invention is to provide condensate water demineralization which can be used for processing condensate water, without giving rise to any serious degradation of ion exchange capacities. This demineralization method is particularly suitable for treating condensate water commonly found in power plants including pressurized water and boiling water reactor nuclear power plants.

The present inventors, after years of research to achieve the above object, found that by using a combination of a specific gel type cation exchange resin and a specific porous type anion exchange resin, a stable performance can be maintained even when the ion exchange resins come in contact with water containing hydrogen peroxide.

Specifically, the present invention relates to condensate, water demineralization wherein a mixed bed of a gel type cation exchange resin and a porous type anion exchange resin is used, the cation exchange resin having a moisture holding capacity of 41% or less or a crosslinkage of 12% or greater.

DESCRIPTION OF THE PREFERRED EMBODIMENT

Figure 1:
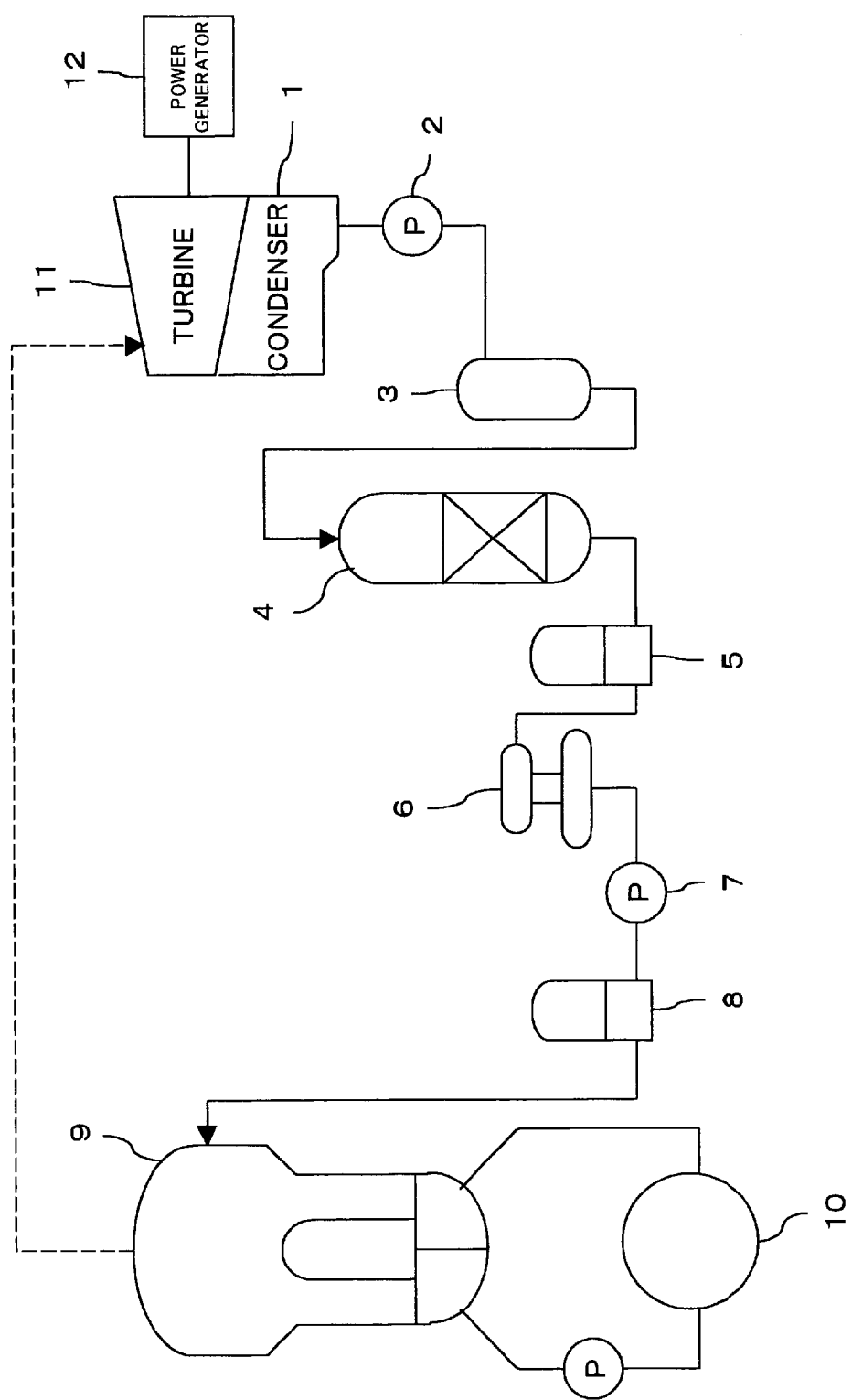
FIG. 1 is a flowchart for a pressurized water reactor nuclear power plant equipped with a condensate water demineralizer of the present invention.

The inventors found that a specific combination of a gel type cation exchange resin and a porous type anion exchange resin can be used to stabilize for a long period of time the performance of the ion exchange resins in a condensate water demineralizer.

Specifically, porous type cation exchange resins such as AMBERLITE 200C from Rohm and Haas Co. and DIAION PK228 from Mitsubishi Chemicals Inc., which are typically used in a pressurized water reactor nuclear power plant, have levels of crosslinkage of 20% and 14%, respectively. The inventors observed that even though these cation exchange resins exhibit good resistance to oxidation due to their high levels of crosslinkage, leachables from these cation exchange resins still affect the anion exchange resins and significantly deteriorate the performance of the anion exchange resins.

This is likely caused, not by macromolecular leachables which are released by the oxidation of the resin, but by resin fines produced by attrition (physical loading) to which porous type ion exchange resins are liable.

To the condensate water in a pressurized water reactor nuclear power plant is added ammonia as a rust preventing reagent and hydrazine as a deoxidizing reagent. While in a once-through boiler of a thermal power plant, because hydrazine is completely decomposed at the boiler, hydrazine is not transported to the vapor side, and thus, hydrazine will not be entrained to the condensate water, in a pressurized water reactor nuclear power plant, on the other hand, part of hydrazine is carried to the condensate water demineralizer.

A regeneration operation is performed periodically in the condensate water demineralizer, and during this periodic operation air scrubbing is performed to remove a small amount of metal oxides in the condensed water which have deposited on the ion exchange resins. In the scrubbing operation, air is blown in, the resins are agitated by bubbles, the metal oxides are dislodged from the resins, and the isolated metal oxides are removed by water backwash.

During the air scrubbing, hydrazine, small amounts of metals, and air are mixed, and hydrazine decomposes through autooxidation using the metals as catalysts to thereby generate hydrogen peroxide. The cation exchange resin is then oxidized by the hydrogen peroxide, and PSS or the like will eventually leach out.

In a boiling water reactor nuclear power plant, no reagent such as a rust-preventing reagent is added to the condensate water and demineralized water as such is used, and thus, normally, the ion exchange resins at the condensate water demineralizer are not oxidized. However, during periodic maintenance, the water within the nuclear reactor is radiation decomposed and hydrogen peroxide is generated. The water within the nuclear reactor is then passed through the condensate water demineralizer when the operation is restarted. Because of this, the water supplied to the condensate water demineralize in a boiling water reactor nuclear power plant contains hydrogen peroxide, which bring about oxidation decomposition of the cation exchange resin, with a result similar to the case with a pressurized water-reactor nuclear power plant.

In the present invention, a gel type cation exchange resin is used. In particular, considering the characteristics of the resins, it is preferable to use a gel type cation exchange resin which has a moisture holding capacity of 41% or less or a crosslinkage of 12% or greater. More preferably, the moisture holding capacity is between 30% and 38% or the crosslinkage is between 14% and 16%.

The moisture holding capacity to be used in the above described criteria is a value determined when the ion form is a standard form (sodium form) as will be described later. When the moisture holding capacity is represented for a case in a regenerated form (hydrogen form), it is preferable to have a moisture holding capacity of 49% or less, and more preferably in a range between 37% and 46%.

The gel type cation exchange resin used in the present invention can be any of the known gel type cation exchange resins. The resin can, for example, be manufactured by copolymerizing an aromatic monovinyl monomer such as styrene, vinyltoluene, vinylxylene, ethylstyrene, and chlorstyrene, with an aromatic polyvinyl monomer such as divinylbenzene and divinyltoluene, and then introducing cation exchange radicals. It is possible to use both aromatic polyvinyl monomer and ester polyvinyl monomer as a polyvinyl monomer, and it is preferable to use a gel type cation exchange resin derived from such polyvinyl monomers. As an ester polyvinyl monomer, for example, ethylene glycol dimethacrylate, diethylene glycol dimethacrylate, neopentyl glycol dimethacrylate, trimethylol propane trimethacrylate, or the like, or an equivalent acrylate can be used independently or as a mixture.

Moisture holding capacity as used in the present specification refers to the ratio of water content measured when the water within the resin capillary is adjusted to a state of saturation equilibrium. In the specification, the moisture holding capacity refers to a value for a gel type strong acid cation exchange resin with a standard ion form (sodium form). In the examples described later in this specification, this value was measured by the following procedure.

(a) A sample resin having a standard form (sodium form) and moisture content at an equilibrium was prepared.

(b) Approximately 5 g of the sample resin prepared as in (a) above was placed into each of two flat balance bins adjusted to a constant weight to weigh the sample weight to an accuracy of 1 mg.

(c) Each sample was placed in a drying container pre-adjusted to 110±5° C., and allowed to dry for 24 hours.

(d) Each sample was allowed to cool for approximately 30 minutes in a desiccator.

(e) The measurement bin was sealed and the mass of each bin was measured, and then the differences (a g) between the bins before drying and the bins after drying, that is, between the weight of the resin in which the moisture content is at an equilibrium and the weight of the resin after the drying, was found and used to calculate the moisture holding capacity (%) using the following formula.

$$M_1 = a/W \times 100$$

where $M_1$ is the moisture holding capacity (%) and W is the weight (g) of the resin in which the water content is at an equilibrium.

The measurement of the weights of the resin with the moisture content at an equilibrium and after the drying was simultaneously made for two samples of the identical resin, and, if the two results differed by more than 0.5%, the examination was repeated until two results coinciding with each other within a difference of 0.5% were obtained. When the two results match within 0.5% difference, the average value of these results was adopted as the examination result.

The level of crosslinkage in the present invention refers to the degree of crosslinkage by the polyvinyl monomer, and specifically, refers to the weight ratio (%) of divinylbenzene with respect to all the vinyl monomers. When an aromatic polyvinyl monomer and ester polyvinyl monomer are both used for the resin, however, the level of crosslinkage cannot be determined by the above definition of the level of crosslinkage. In such cases, a preferable gel type cation exchange resin can be selected and determined based on the moisture holding capacity.

In a gel type ion exchange resin, the moisture holding capacity and the degree of crosslinkage have a close relationship to each other, and, generally, as the degree of crosslinkage increases, the moisture holding capacity decreases in a gel type ion exchange resin.

When the moisture holding capacity exceeds 41% or the degree of crosslinkage is below 12% in a gel type cation exchange resin, the resistance to oxidation is low, and such a gel type cation exchange resin is therefore not preferred.

As a gel type cation exchange resin for use in the present invention, any commercially available cation exchange resin which has a moisture holding of 41% or less or a degree of crosslinkage of 12% or greater can be used. Examples of suitable commercially available gel type cation exchange resins includes AMBERLITE IR-124, AMBERLITE XT-1006 (trade name, Rohm and Haas Co.), DIAION SK112, and DIAION SK116 (trade name, Mitsubishi Chemicals Inc.).

In the present invention, porous type anion exchange resins to be used with the gel type cation exchange resin includes both MR (macroreticular) type and MP (macroporous) types.

In the present invention, a porous type anion exchange resin is used because, in general, a porous type anion exchange resin has a better resistance to fouling than a gel type anion exchange resin.

Any known and/or commercially available porous type anion exchange resin with a diameter between 100 and 1000 $\mu$m can be used in the present invention, and can be either strong by basic or weakly basic.

Examples of suitable commercially available porous type anion exchange resins include AMBERLITE IRA-900, AMBERLITE IRA-910 (trade name, Rohm and Haas Co.), DIAION PA308, DIAION PA312, DIAION PA316, DIAION PA408, DIAION PA412, DIAION PA418 (trade name, Mitsubishi Chemicals, Inc.), DOWEX MSA-1, DOWEX MSA-2 (trade name, Dow Co.), and LEWATIT MP500 (trade name, Bayer Co.). It is preferable that a porous type anion exchange resin employed in the present invention has a specific surface area of 1 $m^2/g$ or more. If the specific surface area is less than 1 $m^2/g$, the capability for adsorbing leachables from the gel type cation exchange resin is low while the reduction in reactivity still high even when the quantity of leachables is small, and therefore not preferred.

The ratio of the gel type cation exchange resin and the porous type anion exchange resin to be used in the present invention, (gel type cation exchange resin):(porous type anion exchange resin), is preferably within a range of 1:2 to 3:1 (volume ratio in standard form). The gel type cation exchange resin is usually used in an H type, and the porous type anion exchange resin is usually. used in OH type.

The condensate water demineralizer of the present invention is effective in applications where the ion exchange resins come in contact with oxidizing materials, especially hydrogen peroxide. In other words, the demineralizer can be preferably used as a condensate water demineralizer in pressurized water reactor nuclear power plants and in boiling water demineralizer nuclear power plants. The condensate water demineralizer is effective for cases where the cation exchange resin comes in contact with hydrogen peroxide.

The condensate water demineralizer of the present invention is characterized by the combination of the ion exchange resins to be used, but the overall structure is equivalent to that of the conventional condensate water demineralizers, and thus, its structure will not be described in detail.

"Demineralizer Structure"

Operational flow of the condensate water demineralizer used in pressurized water reactor nuclear power plants will now be described by referring to FIG. 1.

In a pressurized water reactor nuclear power plant, steam is supplied to a turbine 11 which is driven by the steam to generate power. The steam discharged from the turbine 11 is introduced to a condenser 1, where the steam is cooled and becomes condensate water. Sea water or the like is used for cooling the condenser 1.

The condensate water obtained at the condenser is supplied to a condensate water filtering apparatus 3 by a condensate water pump 2, where solid materials are filtered out. There are some cases where no condensate water filtering apparatus is provided. The filtrate flowing out of the condensate water filtering apparatus 3 is fed to a condensate water demineralizer 4 of the present invention where the condensate water is purified (demineralized). In other words, the condensate water demineralizer 4 is filled with a gel type cation exchange resin and a porous type anion exchange resin, and various ions included in the condensate water are removed.

The condensate water which is purified (demineralized) at the condensate water demineralizer 4 is then heated at a low pressure feed water heater 5 and degassed at a degasifier 6. The degassed condensate water is pressurized to a predetermined pressure by a feed pump 7, heated at a high pressure feed water heater 8, and fed to a steam generator 9. At the steam generator 9, heat is exchanged with a high temperature and high pressure water supplied from a nuclear reactor 10, so that the condensate water becomes a steam, which is then supplied to the turbine 11, where a power generator 12 is driven to generate power.

In the power generation cycle, ammonia and hydrazine are added downstream (at a point near the steam generator 9) of the condensate water demineralizer 4 for preventing rust. These compounds are then circulated via the steam generator 9 forward to the condensate water demineralizer 4. In particular, the steam generator 9 is typically operated at approximately 270° C. which is lower than the temperature in a boiler at a fossil-fueled power plant. Because of this, only a portion of hydrazine is decomposed, and there will be some hydrazine remaining in the condensate water, which is sent to the condensate water demineralizer 4.

The condensate water demineralization 4 is regenerated when its ion exchange capacity is exhausted. Regeneration is effected by passing a hydrochloric acid solution for the cation resin and a sodium hydroxide solution for the anion resin. During the regeneration, air scrubbing is carried out to dislodge small amounts of metal oxides from the resin surfaces. The dislodged metal oxides are then removed from the system by water backwash.

During the air scrubbing, hydrazine oxidizes itself (autooxidation) with the small amounts of metal as a catalyst, and hydrogen peroxide is generated. While in a conventional system a cation exchange resin is generally vulnerable to hydrogen peroxide and normally liable to degradation, in the present invention, a gel type cation exchange resin with a predetermined degree of crosslinkage is used, and therefore, the cation exchange resin is resistant to decomposition by hydrogen peroxide, thereby increasing the lifetime of the cation exchange resin. Moreover, because the cation exchange resin does not decompose as easily, the lifetime of the anion exchange resin can also be elongated.

In particular, because a porous type resin is used as the anion exchange resin, the anion exchange resin has a larger surface area, resulting in reduction of lifetime degradation due to PSS or the like adhering to the resin.

Because blowdown water in the steam generator 9 is generally also sent to the condenser 1, hydrazine also flows into the condensate water demineralizer 4 from this route.

Figure 2:
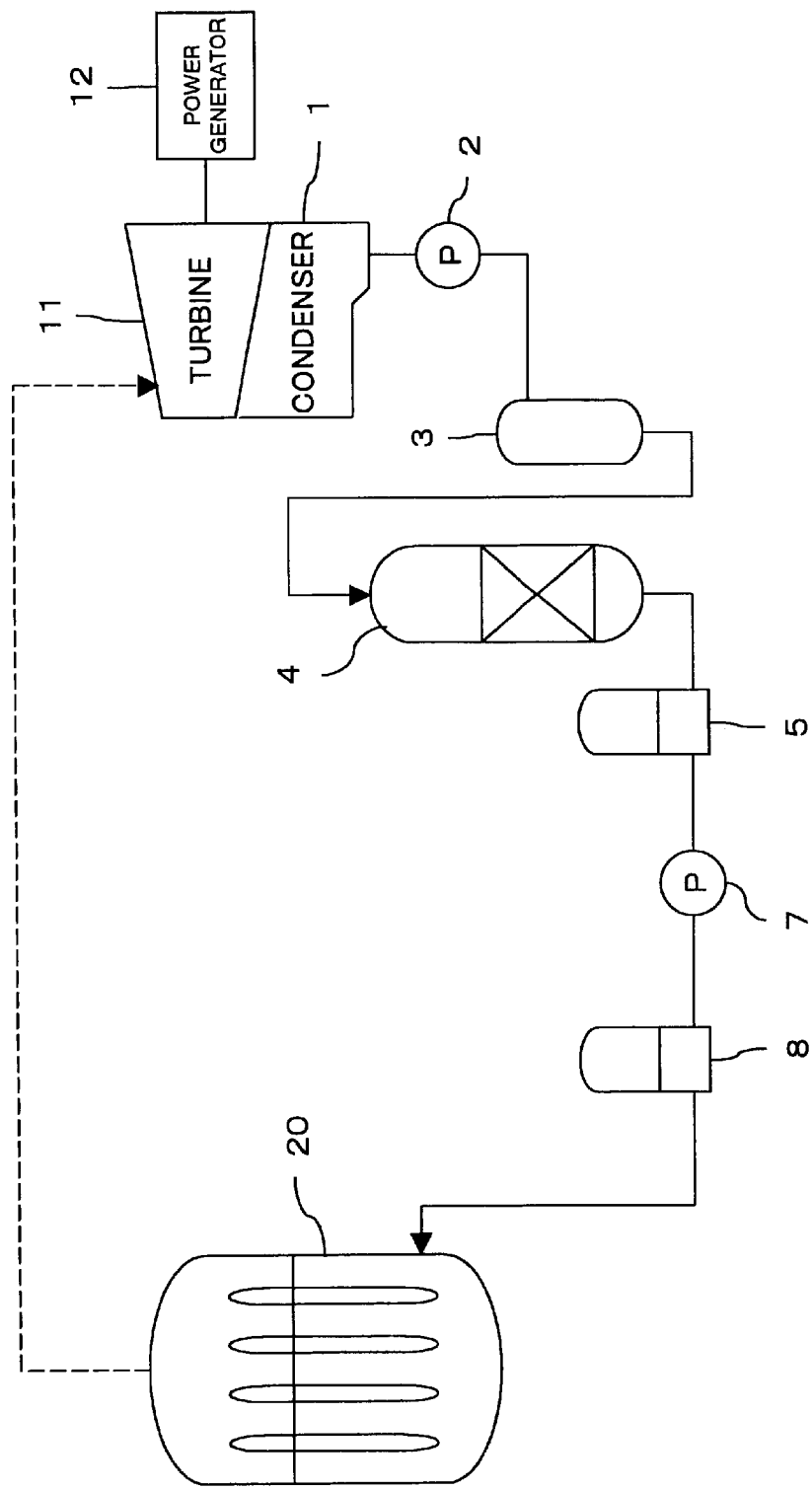
FIG. 2 is a flowchart for a boiling water reactor nuclear power plant equipped with a condensate water demineralizer of the present invention.

FIG. 2 shows the flow of a condensate water demineralizer used in a boiling water reactor nuclear power plant.

In a boiling water reactor nuclear power plant, the plant structure is basically identical to the pressurized water reactor nuclear power plant, with the exception that the condensate water is directly supplied to a nuclear reactor 20 where the condensate water is heated and vaporized. In other words, the steam generated at the nuclear reactor 20 is supplied to a turbine 11 where a power generator 12 is driven to generate power. The steam from the turbine 11 is then circulated to the nuclear reactor 20 via a condenser 1, a condensate water pump 2, a condensate water filter 3, a condensate water demineralizer 4, a low pressure feed water heater 5, feed water pump 7, and high pressure feed water heater 8.

In such a boiling water reactor nuclear power plant, water within the nuclear reactor 20 is decomposed by radiation when the power generation is interrupted, resulting in generation of hydrogen peroxide. The steam generated in the nuclear reactor 20 is eventually transferred to the condenser 1, and thus, water containing hydrogen peroxide flows into the condensate water demineralizer 4. Therefore, just as in the case of the pressurized water reactor nuclear power plant example described above, degradation of the cation exchange resin tends to occur at the condensate water demineralizer 4. In the present embodiment, the effects and damages due to hydrogen peroxide are inhibited by using a gel type cation exchange resin with a given degree of crosslinkage.

The results of various experiments will now be explained.

The experiments were performed using each of the ion exchange resins shown in Tables 1 (showing cation exchange resins) and 2 (showing anion exchange resins).

TABLE 1

| RESIN BRAND | MANUFACTURER | TYPE | DEGREE OF CROSSLINKAGE (%) | MOISTURE HOLDING CAPACITY (%)* |
|---|---|---|---|---|
| Ambelite 200CP | Rohm and Haas | Porous | 20 | 49 |
| Diaion PK228 | Mitsubishi Chemicals | Porous | 14 | 40 |
| Amberlite IR120B | Rohm and Haas | Gel | 8 | 46 |
| Amberlite IR124 | Rohm and Haas | Gel | 12 | 41 |
| Amberlite XT1006 | Rohm and Haas | Gel | 16 | 37 |

*: Standard form (Na form)

TABLE 2

| RESIN BRAND | MANUFACTURER | TYPE | SPECIFIC SURFACE AREA |
|---|---|---|---|
| Amberlite IRA400 | Rohm and Haas | Gel | 0.1 or less |
| Amberlite IRA900 | Rohm and Haas | Porous | Approximately 18 |

EXAMPLE 1

100 ml each of the five types of cation exchange resins and 100 ml of anion exchange resin Amberlite IRA 400 were measured. Each of the cation exchange resins was mixed with the anion exchange resin and filled in an acrylic column with an inside diameter of 25 mm. Scrubbing air was introduced from the bottom of the column to create an environment where the resins are rubbed.

Because iron rust (commonly called cruds) is present in the condensate water, 1 g/L-resin of iron oxide was added to simulate this, and scrubbing was performed for 16 hours.

Then, in order to check any effect of the cation exchange resin on the fouling of the anion exchange resin, the mass transfer coefficient (hereinafter abbreviated to "MTC") of the anion exchange resin was measured. The results are shown in Table 3.

TABLE 3

| BRAND OF COMPANION CATION EXCHANGE RESIN | MTC VALUE FOR ANION EXCHANGE RESIN AMBERLITE IRA400 ($\times 10^{-4}$ m/sec.) |
|---|---|
| Amberlite 200CP | 1.1 |
| Diaion PK228 | 1.2 |
| Amberlite IR120B | 2.0 |
| Amberlite IR124 | 2.0 |
| Amberlite XT1006 | 2.0 |

The measurement of MTC of the anion exchange resin was made as follows. New cation exchange resins regenerated under the conditions shown in Table 4 were prepared, each of these resins was mixed with an anion exchange resin which is treated as described above, separated and regenerated, in a mixing ratio of 2/1, and the mixture was charged into a column. Feed water with an $NH_3$ concentration of 1500 ppb and an $Na_2SO_4$ m concentration of 300 ppb was passed through the column with a linear velocity (LV) of 120 m/hour, and the $SO_4$ concentration of the outlet (treated) water from the column was measured. Then, the $SO_4$ concentration of the treated water at the time when this $SO_4$ concentration had stabilized and the $SO_4$ concentration of the feed water at the column inlet were measured. Finally, the MTC value was calculated by the following formula using these measured $SO_4$ concentration values, and void ratios of the anion exchange resin and the particle size of the resin which were separately measured.

$$K=\{1/6(1-\epsilon)R\}\cdot\{F/(A\times L)\}\cdot d\cdot ln(C_0/C)$$

where K is the mass transfer coefficient (m/sec.), $\epsilon$ is the void ratio, R is the ratio of anion exchange resin, F is the flow rate of feed water ($m^3$/sec.), A is the cross sectional area of the column ($m^2$), L is the height of the resin layer (m), d is the particle size of the resin (m), $C_0$ is the $SO_4$ concentration at the column inlet, and C is the $SO_4$ concentration at the column outlet.

TABLE 4

Regeneration Conditions

| RESIN | CATION EXCHANGE RESIN | ANION EXCHANGE RESIN |
|---|---|---|
| REGENERATION LEVEL | 35% HCL, 350 g/L-R | 100% NaOH, 200 g/L-R |
| REGENERANT CONCENTRATION | 5% | 7% |
| REGENERANT VELOCITY | SV* = 4 (Room Temperature) | SV = 4 (55° C.) |
| DISPLACEMENT SV/TIME | SV = 4, 60 minutes (Room Temperature) | SV = 4 (55° C.) |
| RINSE SV/TIME | SV = 10, 60 minutes (Room Temperature) | SV = 10, 60 minutes (Room Temperature) |

*SV = Space Velocity

As is apparent from the results shown in Table 3, porous cation exchange resins 200CP and PK228 led to significant drops in the MTC of the anion resin, which serves as an indicator of the reactivity of the anion exchange resin, from the value $2.0 \times 10^{-4}$ m/sec. for a new resin. The gel type cation exchange resins, on the other hand, resulted in no significant drop in the MTC value of the anion resin, and thus, considered to be good for use in the condensate water demineralizer in accordance with the present invention.

EXAMPLE 2

100 ml each of the five types of cation exchange resins as described above and 200 ml of anion exchange resin Amberlite IRA400 were measured. Each of the five cation exchange resins mixed with the anion exchange resin was charged into an acrylic column with an inside diameter of 25 mm. Feed water containing hydrogen peroxide with a concentration of 3 ppm was passed through the column with a flow rate of 40 m/h. Iron ions were added beforehand so that the cation exchange resin was loaded with 20 g Fe/L-resin.

The feed water was passed for 16 hours under the above-mentioned conditions. Then, the MTC value of the anion exchange resin was measured in order to check any fouling effect of the cation exchange resins on the anion exchange resin. The results are shown in Table 5.

TABLE 5

| BRAND OF COMBINED CATION EXCHANGE RESIN | DEGREE OF CROSS-LINKAGE (%) | MTC VALUE OF ANION EXCHANGE RESIN AMBERLITE IRA400 ($\times 10^{-4}$ m/sec.) |
|---|---|---|
| Amberlite 200CP | 20 | 2.0 |
| Diaion PK228 | 14 | 2.0 |
| Amberlite IR120B | 8 | <0.5 |
| Amberlite IR124 | 12 | 1.8 |
| Amberlite XT1006 | 16 | 2.0 |

As can be seen from Table 5, the effects of oxidizing agents depend on the degree of crosslinkage of the cation exchange resins. The results indicate that the effect starts to decrease around at a level of crosslinkage of 12% and then stabilizes.

EXAMPLE 3

Example 3 was performed with identical conditions as in example 1 except that Amberlite IR124 was used as a cation exchange resin, two types of anion exchange resins, porous type Amberlite IRA900 and gel type Amberlite IRA400 were used for combining with the cation exchange resin, and the resistance to fouling of the anion exchange resin was evaluated using the MTC value as a indicator. The results are shown in Table 6.

TABLE 6

| CATION EXCHANGE RESIN BRAND | COMPANION ANION EXCHANGE RESIN | TYPE OF ANION EXCHANGE RESIN | MTC VALUE OF ANION EXCHANGE RESIN ($\times 10^{-4}$ m/s) |
|---|---|---|---|
| Amberlite IR124 | Amberlite IRA900 | Porous | 2.0 |
| Amberlite IR124 | Amberlite IRA400 | Gel | <0.5 |

As is apparent from Table 6, a porous type anion exchange resin is better in the resistance to fouling the pollution resistivity than a gel type anion exchange resin when combined with the cation exchange resin.

As described, according to the present invention, the condensate water demineralizer performance and the ion exchange resin performance can be maintained for a longer period of time, and thus, the demineralizer is particularly suitable for processing condensate water within a pressurized water reactor or boiling water reactor nuclear power plant.

What is claimed is:

1. A condensate water demineralizer for a power plant, said condensate water demineralizer disposed so as to receive a flow of condensate water, wherein the condensate water demineralizer comprises a mixed bed of a gel type cation exchange resin and a porous type anion exchange resin, said cation exchange resin being selected to substantially reduce degradation of performance, as measured by a mass transfer coefficient, of said anion exchange resin and having a moisture holding capacity of at most 41% or a degree of crosslinkage of at least 12%, wherein said power plant is a pressurized water reactor nuclear power plant.

2. The condensate water demineralizer of claim 1, wherein the specific surface area of said porous type anion exchange resin is at least 1 $m^2$/g.

* * * * *